United States Patent
Hatakeyama (10) Patent No.: US 12,223,096 B2
(45) Date of Patent: Feb. 11, 2025

(54) ACCESS CONTROL APPARATUS, ACCESS CONTROL METHOD, AND PROGRAM

(71) Applicant: SONY INTERACTIVE ENTERTAINMENT INC., Tokyo (JP)

(72) Inventor: Akiyuki Hatakeyama, Kanagawa (JP)

(73) Assignee: SONY INTERACTIVE ENTERTAINMENT INC., Tokyo (JP)

( * ) Notice: Subject to any disclaimer, the term of this patent is extended or adjusted under 35 U.S.C. 154(b) by 351 days.

(21) Appl. No.: 17/623,970

(22) PCT Filed: Jul. 21, 2020

(86) PCT No.: PCT/JP2020/028298
§ 371 (c)(1),
(2) Date: Dec. 30, 2021

(87) PCT Pub. No.: WO2021/015204
PCT Pub. Date: Jan. 28, 2021

(65) Prior Publication Data
US 2022/0261505 A1    Aug. 18, 2022

(30) Foreign Application Priority Data
Jul. 23, 2019 (JP) .................................. 2019-135539

(51) Int. Cl.
*G06F 21/64* (2013.01)
*H04L 9/08* (2006.01)

(52) U.S. Cl.
CPC ............ *G06F 21/64* (2013.01); *H04L 9/0861* (2013.01)

(58) Field of Classification Search
None
See application file for complete search history.

(56) References Cited

U.S. PATENT DOCUMENTS 5,757,919 A * 5/1998 Herbert .................. G06F 21/86
                                                   711/E12.092
7,266,842 B2 * 9/2007 Foster ..................... G06F 21/85
                                                             726/17
(Continued)

FOREIGN PATENT DOCUMENTS

EP    1255372 A1 *  5/2001  ............... H04L 9/32
EP    1615370 A1 *  7/2004  ............... H04L 9/32
(Continued)

OTHER PUBLICATIONS

Kent, Karen Ann, and Murugiah Souppaya. "Guide to Computer Security Log Management:. " (2006). (Year: 2006).*

(Continued)

*Primary Examiner* — Paul R Fisher
(74) *Attorney, Agent, or Firm* — XSENSUS LLP (57) ABSTRACT

Provided are an access control apparatus, an access control method, and a program that can reduce risks of tampering with a block while at the same time keeping ICV data size to a minimum. An individual key generation section (52) generates an individual key specific to an information processing apparatus (12). An ICV data generation section (56) generates, by using an individual key, ICV data that is based on verified digest value data, specific to the information processing apparatus (12), and smaller in data size than the digest value data. An ICV calculation section (64) calculates, by using the individual key, an ICV based on the block to which access is requested. A comparison section (66) compares the ICV indicated by a part of the ICV data corresponding to the block with the ICV calculated by the ICV calculation section (64). A writing section (68) writes the block to a memory in a case where the comparison succeeds.

12 Claims, 7 Drawing Sheets

(56) References Cited

U.S. PATENT DOCUMENTS

| | | | |
|---|---|---|---|
| 9,992,197 B2 * | 6/2018 | Agiwal | H04W 12/02 |
| 11,190,528 B2 * | 11/2021 | Tzeng | H04L 63/20 |
| 2002/0083282 A1 * | 6/2002 | Yoshino | G06F 21/79 |
| | | | 711/163 |
| 2002/0147920 A1 * | 10/2002 | Mauro | G06Q 20/3678 |
| | | | 726/26 |
| 2003/0200448 A1 * | 10/2003 | Foster | G06F 21/64 |
| | | | 726/30 |
| 2003/0236987 A1 * | 12/2003 | Griffin | G06F 21/602 |
| | | | 713/189 |
| 2006/0174323 A1 * | 8/2006 | Brown | H04L 63/0428 |
| | | | 726/3 |
| 2008/0044012 A1 * | 2/2008 | Ekberg | H04W 12/033 |
| | | | 380/30 |
| 2008/0253569 A1 * | 10/2008 | Lim | H04L 9/3242 |
| | | | 380/258 |
| 2008/0256365 A1 * | 10/2008 | Eckleder | G11B 20/0021 |
| | | | 713/189 |
| 2010/0246823 A1 * | 9/2010 | Xiao | H04W 12/50 |
| | | | 380/268 |
| 2012/0278902 A1 * | 11/2012 | Martin | G06F 8/65 |
| | | | 717/172 |
| 2013/0254494 A1 * | 9/2013 | Oxford | G06F 12/1466 |
| | | | 711/145 |

FOREIGN PATENT DOCUMENTS

| | | | | |
|---|---|---|---|---|
| EP | 1835432 A1 * | 3/2007 | | G06F 21/00 |
| JP | 2002-111648 A | 4/2002 | | |
| JP | 2019-020872 A | 2/2019 | | |
| WO | 2008/056700 A1 | 5/2008 | | |
| WO | WO2011109795 A2 * | 9/2011 | | |
| WO | 2018/138212 A1 | 8/2018 | | |

OTHER PUBLICATIONS

International Search Report and Written Opinion mailed Oct. 27, 2020, from PCT/JP2020/028298, 8 sheets.

* cited by examiner

ACCESS CONTROL APPARATUS, ACCESS CONTROL METHOD, AND PROGRAM

TECHNICAL FIELD

The present invention relates to an access control apparatus, an access control method, and a program.

BACKGROUND ART

There is known an integrity check technology that compares a digest value (integrity check value (ICV)) calculated from a block to which access is requested with an ICV verified in advance and allows access to the block in question in a case where the comparison succeeds. At the time of execution of a program, access is made to the block which, it has been confirmed by integrity check, is neither damaged nor tampered with.

SUMMARY

Technical Problems

In the integrity check, it is necessary to keep ICV data indicating the verified ICV resident in the memory. Accordingly, if the ICV data placed in the memory is large in data size, the memory size available for executing the program is small.

Also, if a correspondence between the block and the ICV data is determined uniquely and if one can see through the correspondence thereof, it becomes possible to tamper with the block and generate ICV data that is consistent with the tampered block.

The present invention has been devised in light of the foregoing, and it is an object of the present invention to provide an access control apparatus, an access control method, and a program that can reduce risks of tampering with a block while at the same time keeping ICV data size to a minimum.

Solution to Problems

In order to solve the above problems, an access control apparatus according to the present invention is an access control apparatus that stores target data to which access is requested and includes a storage, an individual key generation section, an ICV data generation section, an ICV calculation section, a comparison section, and a writing section. The storage stores the target data. The individual key generation section generates an individual key specific to the access control apparatus. The ICV data generation section generates ICV data that is based on verified digest value data, specific to the access control apparatus, and smaller in data size than the digest value data. The ICV calculation section calculates, by using the individual key, an ICV based on a block that is a part of the target data to which access is requested. The comparison section compares the ICV indicated by the part of the ICV data corresponding to the block with the ICV calculated by the ICV calculation section. The writing section writes the block to a memory in a case where the comparison succeeds.

In one mode of the present invention, the storage further stores encrypted digest value data that is different from the target data. The access control apparatus further includes a decryption section and a verification section. The decryption section generates decrypted digest value data by decrypting the encrypted digest value data. The verification section verifies the digest value data by comparing a digest value calculated on the basis of a value of the digest value data with the digest value indicated by the decrypted digest value data. The individual key generation section generates the individual key in a case where the verification succeeds.

In this mode, the access control apparatus further includes a digest value data generation section that generates the digest value data on the basis of the target data. The verification section verifies the digest value data generated by the digest value data generation section by comparing the digest value calculated on the basis of a value of the digest value data generated by the digest value data generation section with the digest value indicated by the decrypted digest value data.

Also, in one mode of the present invention, the ICV data generation section places the generated ICV data in a kernel memory, and the writing section writes the block to a user memory.

In this mode, the access control apparatus further includes an access request acceptance section that accepts an access request to the block associated with an ICV indicated by the part of the ICV data corresponding to the block read out from the kernel memory.

Also, another access control apparatus according to the present invention is an access control apparatus that includes a secure module, a main processor, a memory, and a storage. The storage stores target data to which access is requested, and the secure module generates an individual key specific to the access control apparatus. The secure module generates, by using the individual key, ICV data that is based on verified digest value data, specific to the access control apparatus, and smaller in data size than the digest value data. The secure module accepts, from the main processor, an access request to a block that is a part of the target data. The secure module calculates an ICV based on the block by using the individual key. The secure module compares the ICV indicated by the part of the ICV data corresponding to the block with the ICV calculated by the secure module. The secure module writes the block to the memory in a case where the comparison succeeds.

In one mode of the present invention, the ICV indicated by the part of the ICV data corresponding to the block is associated with the access request.

Also, in one mode of the present invention, the secure module stores the individual key, and the main processor is not able to access the individual key stored in the secure module.

Also, an access control method according to the present invention includes a step of generating an individual key specific to an access control apparatus that stores target data to which access is requested, a step of generating, by using the individual key, ICV data that is based on verified digest value data, specific to the access control apparatus, and smaller in data size than the digest value data, a step of calculating, by using the individual key, an ICV based on a block that is a part of the target data to which access is requested, a step of comparing the ICV indicated by the part of the ICV data corresponding to the block with the ICV calculated in the step of calculating, and a step of writing the block to a memory in a case where the comparison succeeds.

Also, a program according to the present invention causes a computer that stores target data to which access is requested to perform a procedure of generating an individual key specific to the computer, a procedure of generating, by using the individual key, ICV data that is based on verified digest value data, specific to the computer, and smaller in data size than the digest value data, a procedure of calculating, by using the individual key, an ICV based on a block that is a part of the target data to which access is requested, a procedure of comparing the ICV indicated by the part of the ICV data corresponding to the block with the ICV calculated by the procedure of calculating, and a procedure of writing the block to a memory in a case where the comparison succeeds.

DESCRIPTION OF EMBODIMENT

A detailed description will be given of an embodiment of the present invention on the basis of drawings.

Figure 1:
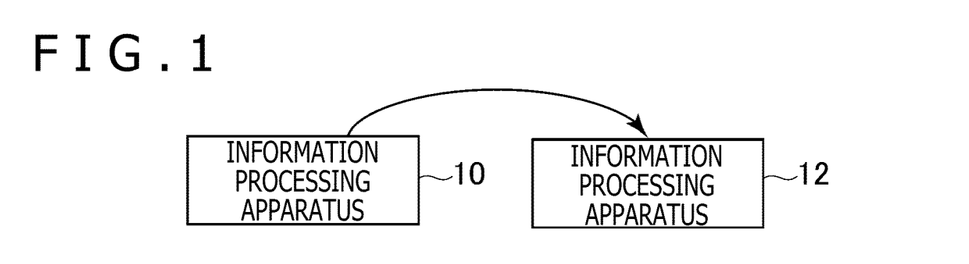
FIG. 1 is a diagram illustrating an example of an overall configuration of an embodiment of the present invention.

FIG. 1 is a diagram illustrating examples of an information processing apparatus 10 and an information processing apparatus 12 according to an embodiment of the present invention. The information processing apparatus 10 and the information processing apparatus 12 according to the present embodiment are, for example, computers such as game consoles or personal computers.

In the present embodiment, a first user such as vendor of a program such as a game program uses the information processing apparatus 10, and a second user who uses the program in question uses the information processing apparatus 12.

The information processing apparatus 10 according to the present embodiment includes a processor, a storage section, a communication section, an operation section, a display section, and the like. The processor is, for example, a program-controlled device such as a CPU (Central Processing Unit). The storage section is storage elements such as a ROM (Read-Only Memory) and a RAM (Random Access Memory) and a hard disk drive. The communication section is a communication interface such as a network board or a wireless LAN (Local Area Network) module. The operation section is a user interface such as a keyboard, a mouse, a game console controller, and the like. The display section is a display device such as a liquid crystal display.

Figure 2:
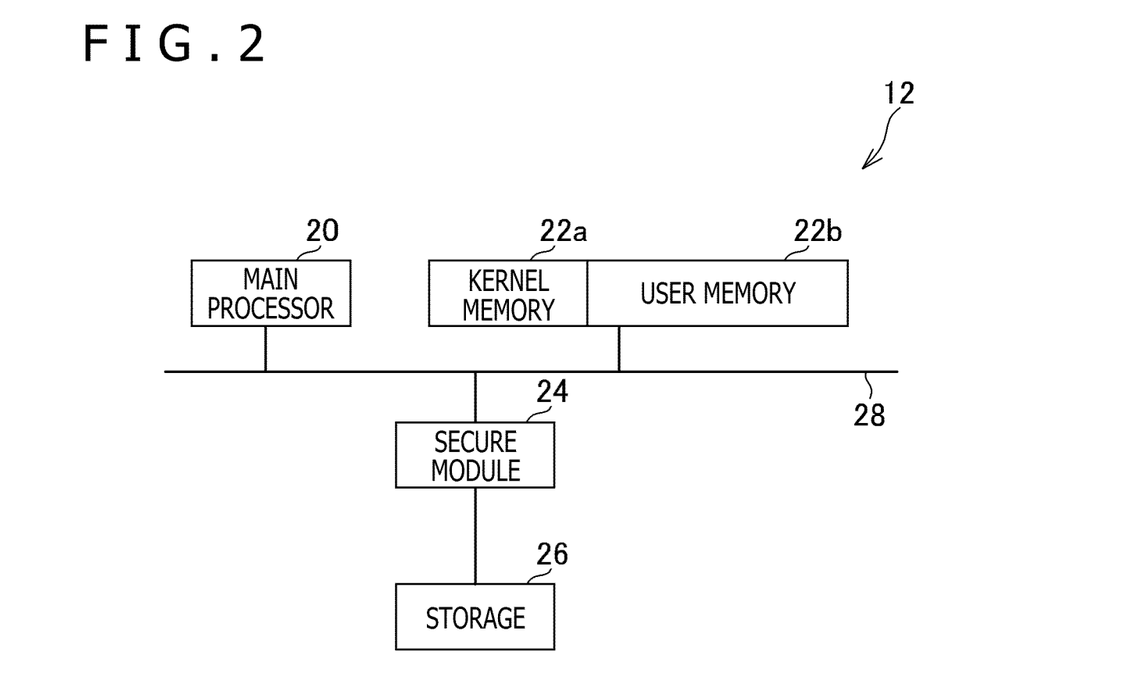
FIG. 2 is a diagram illustrating an example of a configuration of an information processing apparatus according to the embodiment of the present invention.

The information processing apparatus 12 according to the present embodiment includes a main processor 20, a memory (a kernel memory 22a and a user memory 22b), a secure module 24, and a storage 26 as illustrated in FIG. 2.

The main processor 20 is, for example, a program-controlled device such as CPU that operates in accordance with a program installed in the information processing apparatus 12.

A region of the kernel memory 22a and a region of the user memory 22b are provided in the memory 22 according to the present embodiment. The kernel memory 22a is a region reserved for placing the kernel of an operating system (OS). The user memory 22b is a region reserved for placing application programs and data used by the application programs.

The secure module 24 is a hardware device that includes, for example, a processor, a secure memory, a storage controller, and the like.

The storage 26 is a storage apparatus such as a hard disk drive.

The main processor 20, the memory 22, and the secure module 24 are connected to a bus 28.

It should be noted that the information processing apparatus 12 may include a communication interface such as network board, an optical disc drive for reading an optical disc such as a DVD (Digital Versatile Disc)-ROM or a Blu-ray (registered trademark) disc, and a USB (Universal Serial Bus) port, and the like. Also, the information processing apparatus 10 may have a similar hardware configuration to the information processing apparatus 12.

Figure 3:
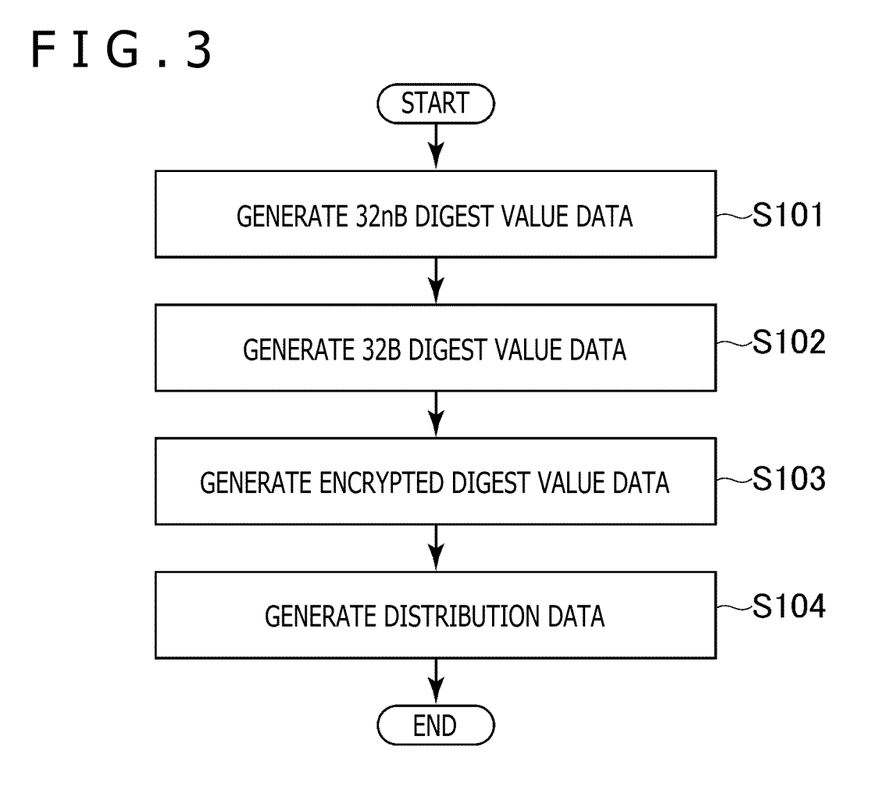
FIG. 3 is a flowchart illustrating an example of a flow of processes performed by the information processing apparatus according to the embodiment of the present invention.

A description will be given here of an example of a flow of processes performed by the information processing apparatus 10 according to the present embodiment with reference to the flowchart illustrated in FIG. 3.

Figure 4:
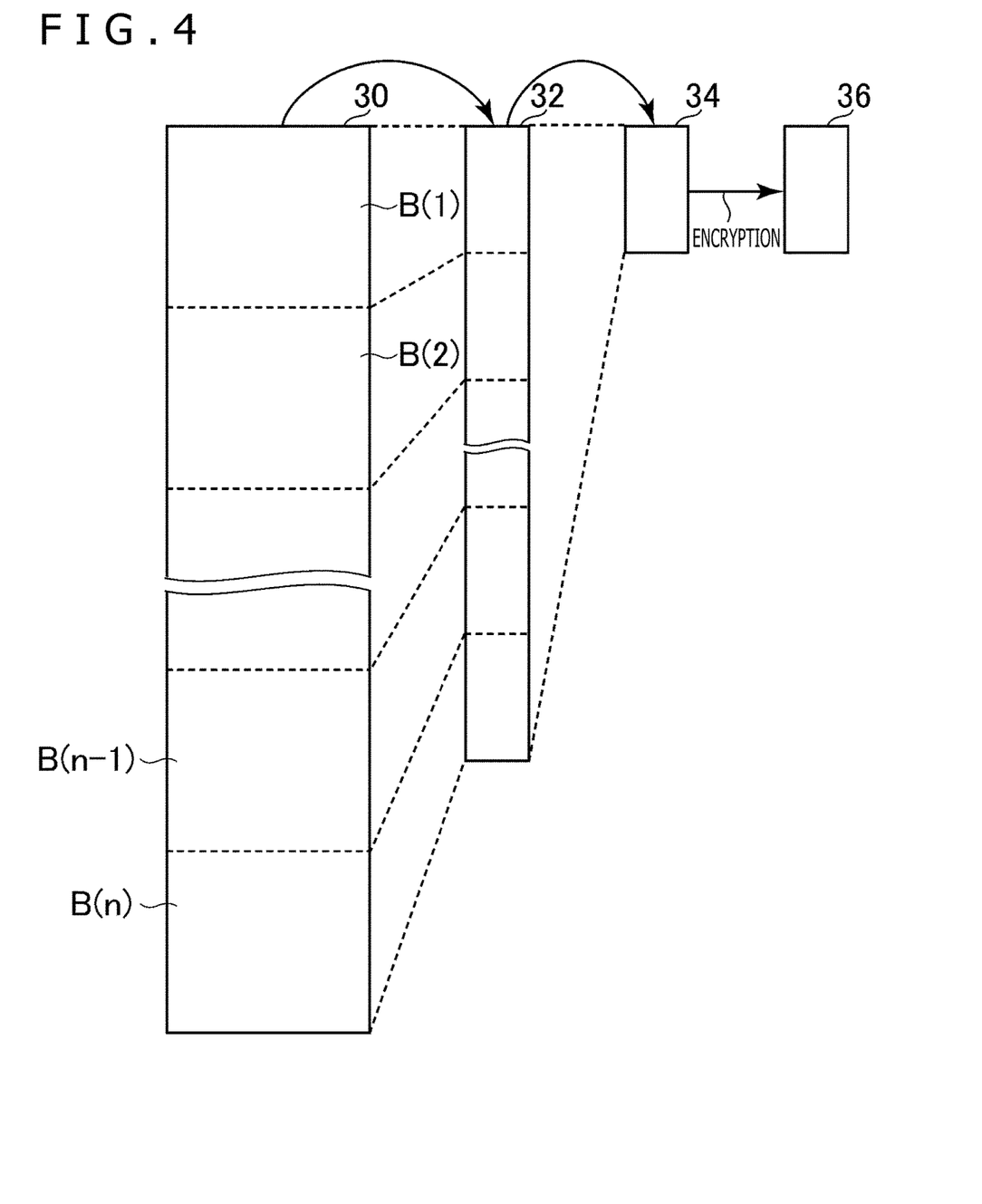
FIG. 4 is a diagram schematically illustrating an example of a relation between target data, 32nB digest value data, 32B digest value data, and encrypted digest value data.

In the present embodiment, for example, target data 30 illustrated in FIG. 4 is developed in the information processing apparatus 10. The target data 30 includes a plurality of objects such as files and directories that are equivalent to programs and data.

In the present embodiment, the target data 30 is managed in such a manner that a block of a given length (e.g., 64 kilobytes) is one unit. In the example illustrated in FIG. 4, the target data 30 includes n blocks from block B(1) to block B(n). That is, the target data 30 illustrated in FIG. 4 is (64×n) bytes in size. Then, in the present embodiment, the target data 30 is accessed on a block-by-block basis.

Then, in the present embodiment, the information processing apparatus 10 calculates a (32×n)-byte digest value on the basis of the target data 30. Then, the information processing apparatus 10 generates 32nB digest value data 32 indicating the calculated digest value (S101). Here, for example, the 32nB digest value data 32 is generated by performing an encryption hash algorithm such as an SHA (Secure Hash Algorithm) 256 algorithm or an SHA3-256 algorithm on the target data 30.

As illustrated in FIG. 4, n 32-byte portions included in the 32nB digest value data 32 are associated one by one with 64-kilobyte blocks, respectively.

Then, in the present embodiment, for example, the information processing apparatus 10 calculates a 32-byte digest value on the basis of the 32nB digest value data 32 generated by the process illustrated in S101. Then, the information processing apparatus 10 generates 32B digest value data 34 indicating the calculated digest value (S102). Here, for example, the 32B digest value data 34 is generated by performing the encryption hash algorithm such as the SHA256 algorithm or the SHA3-256 algorithm on the 32nB digest value data 32.

Then, in the present embodiment, for example, encrypted digest value data 36 is generated on the basis of the 32B digest value data 34 generated by the process illustrated in S102 (S103). Here, for example, the encrypted digest value data 36 is generated by encrypting the 32B digest value data 34 with a secret key managed secretly by the information processing apparatus 10 by using a public key encryption scheme such as RSA.

Then, in the present embodiment, for example, distribution data is generated that includes the target data 30 and the encrypted digest value data 36 generated by the process illustrated in S103 (S104), after which the processes illustrated in the present processing example are terminated.

In the present embodiment, the distribution data described above generated by the information processing apparatus 10 is provided to the information processing apparatus 12. Then, the information processing apparatus 12 accesses an object included in the distribution data.

Then, in the present embodiment, the information processing apparatus 12 performs integrity check on the block to which access is requested at the time of execution of a program. Then, access is made to the block which, it has been confirmed by the integrity check, is neither damaged nor tampered with.

Figure 5:
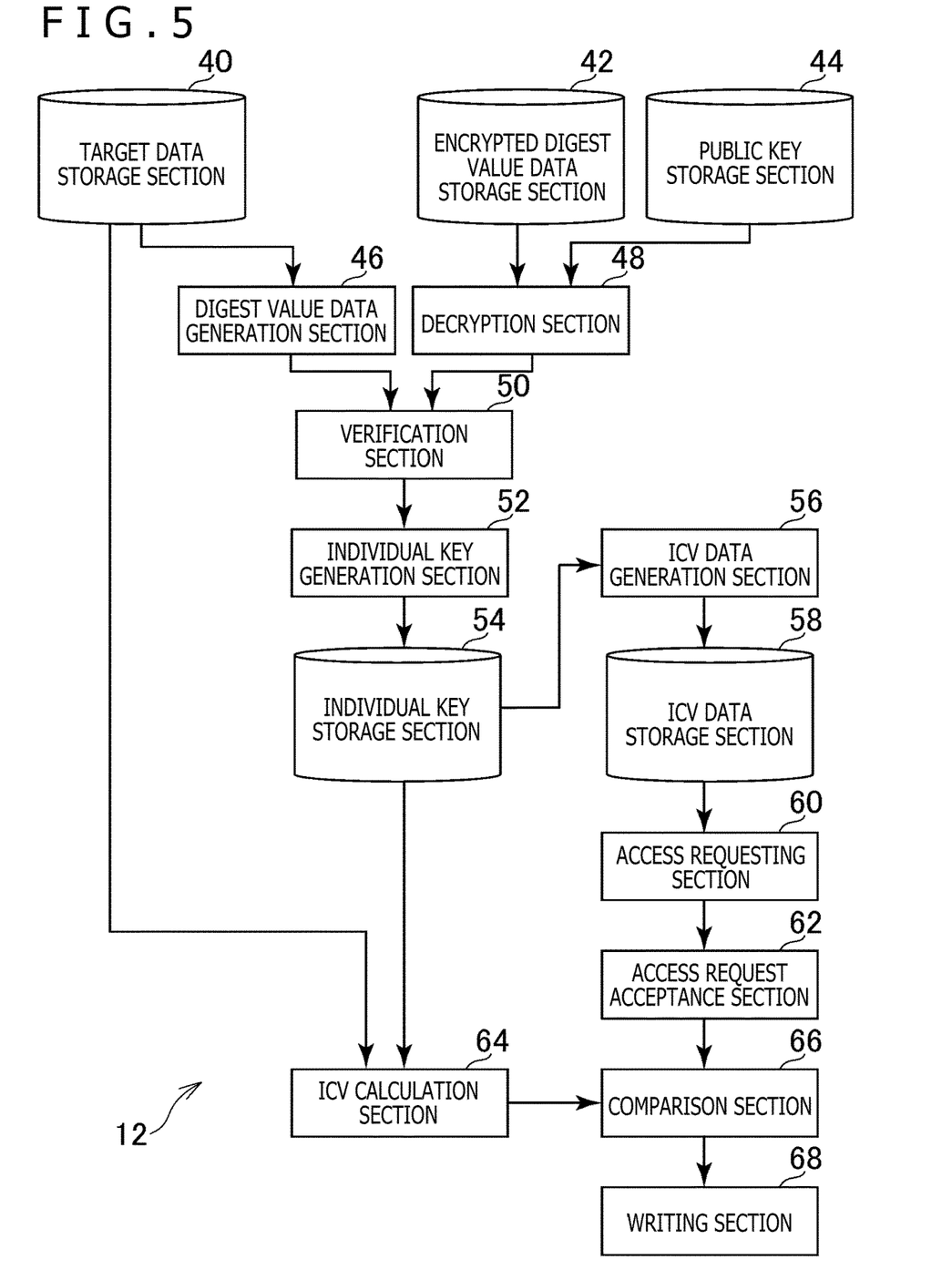
FIG. 5 is a functional block diagram illustrating examples of pieces of functionality of the information processing apparatus according to the embodiment of the present invention.

FIG. 5 is a functional block diagram illustrating examples of pieces of functionality of the information processing apparatus 12 according to the present embodiment. It should be noted that there is no need to implement all the pieces of functionality illustrated in FIG. 5 in the information processing apparatus 12 according to the present embodiment and that pieces of functionality other than those illustrated in FIG. 5 may also be implemented.

As illustrated in FIG. 5, the information processing apparatus 12 functionally includes, for example, a target data storage section 40, an encrypted digest value data storage section 42, a public key storage section 44, a digest value data generation section 46, a decryption section 48, a verification section 50, an individual key generation section 52, an individual key storage section 54, an ICV data generation section 56, an ICV data storage section 58, an access requesting section 60, an access request acceptance section 62, an ICV calculation section 64, a comparison section 66, and a writing section 68.

The target data storage section 40, the encrypted digest value data storage section 42, and the public key storage section 44 are mainly implemented in the storage 26. The digest value data generation section 46, the decryption section 48, the verification section 50, the individual key generation section 52, the individual key storage section 54, the ICV data generation section 56, the access request acceptance section 62, the ICV calculation section 64, the comparison section 66, and the writing section 68 are mainly implemented in the secure module 24. The ICV data storage section 58 is mainly implemented in the kernel memory 22a. The access requesting section 60 is mainly implemented in the main processor 20.

The above pieces of functionality may be implemented as a result of execution of a program that is installed in the information processing apparatus 12 which is a computer and that includes instructions corresponding to the above pieces of functionality by the main processor 20 and the secure module 24. This program may be supplied to the information processing apparatus 12 via a computer-readable information storage medium such as an optical disc, a magnetic disk, a magnetic tape, a magneto-optical disk, or a flash memory or via the Internet or other means. Alternatively, this program may be supplied to the information processing apparatus 12 from the information processing apparatus 10.

In the present embodiment, for example, the target data storage section 40 stores the target data 30 that is provided from the information processing apparatus 10 and to which access is requested.

In the present embodiment, for example, the encrypted digest value data storage section 42 stores the encrypted digest value data 36 that is provided from the information processing apparatus 10.

In the present embodiment, for example, the public key storage section 44 stores a public key corresponding to the secret key described above. The public key may be stored in advance in the information processing apparatus 12 or provided from the information processing apparatus 10.

Figure 6:
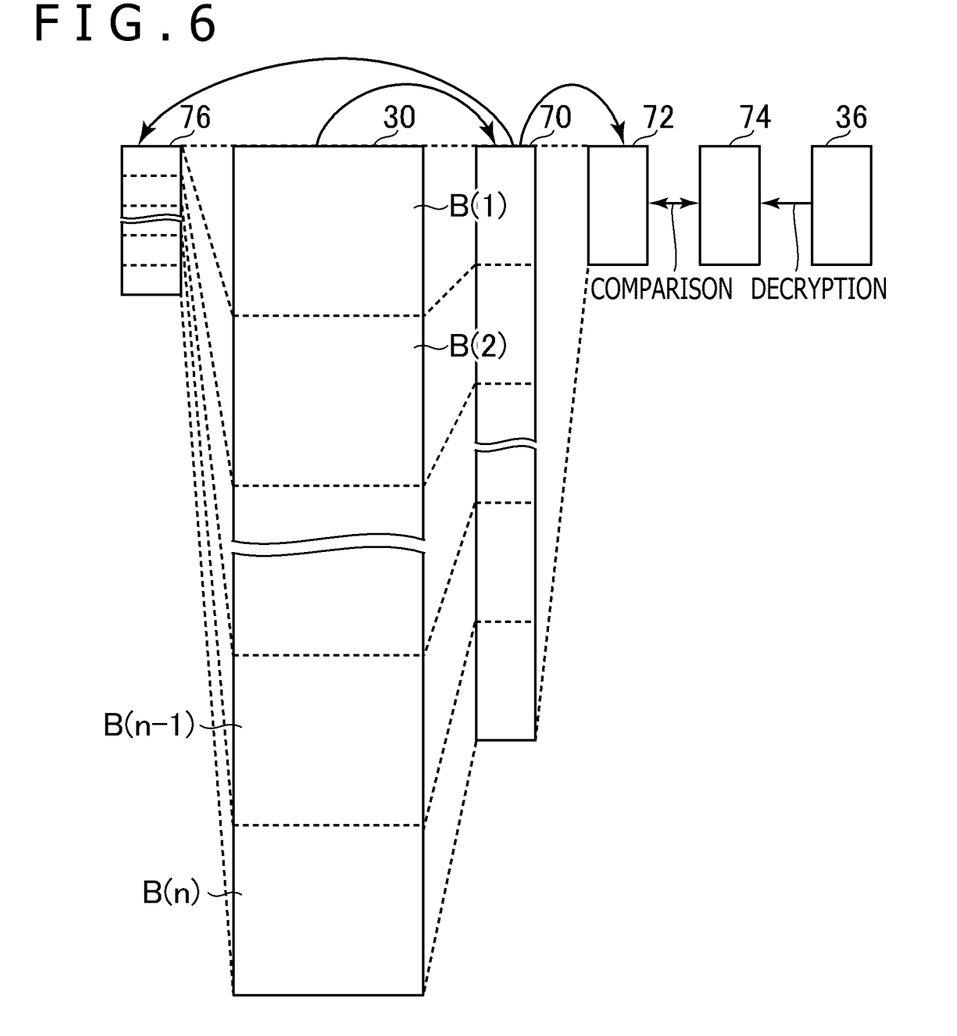
FIG. 6 is a diagram schematically illustrating an example of a relation between the target data, the 32nB digest value data, the 32B digest value data, the encrypted digest value data, decrypted digest value data, and ICV data.

In the present embodiment, for example, the digest value data generation section 46 calculates a (32×n)-byte digest value on the basis of the target data 30 stored in the target data storage section 40 as illustrated in FIG. 6. Then, in the present embodiment, the digest value data generation section 46 generates, for example, 32nB digest value data 70 indicating the calculated digest value. Here, for example, the 32nB digest value data 70 is generated by performing the encryption hash algorithm such as the SHA256 algorithm or the SHA3-256 algorithm on the target data 30. Normally, the 32nB digest value data 70 is generated that has the same value as the 32nB digest value data 32 generated by the process illustrated in S101 described above.

Also, in the present embodiment, for example, the digest value data generation section 46 generates a 32-byte digest value on the basis of the 32nB digest value data 70 generated by the digest value data generation section 46 as illustrated in FIG. 6. Then, the digest value data generation section 46 generates 32B digest value data 72 indicating the calculated digest value. Normally, the 32B digest value data 72 is generated that has the same value as the 32B digest value data 34 generated by the process illustrated in S102 described above.

In the present embodiment, for example, the decryption section 48 generates decrypted digest value data 74 by decrypting the encrypted digest value data 36 stored in the encrypted digest value data storage section 42 as illustrated in FIG. 6. Here, for example, the decrypted digest value data 74 is generated by decrypting the encrypted digest value data 36 with a public key stored in the public key storage section 44 by using the public key encryption scheme such as RSA. Normally, the decrypted digest value data 74 is generated that has the same value as the 32B digest value data 34 generated by the process illustrated in S102 described above.

The verification section 50 verifies the 32nB digest value data 70 by comparing the digest value calculated by the digest value data generation section 46 with the digest value indicated by the decrypted digest value data 74. Here, for example, the digest value indicated by the 32B digest value data 72 generated by the digest value data generation section 46 is compared with the digest value indicated by the decrypted digest value data 74.

In the present embodiment, for example, the individual key generation section 52 generates an individual key specific to the information processing apparatus 12 if the verification by the verification section 50 succeeds (e.g., if two digest values match). Here, for example, a pseudorandom number value generated by using a pseudorandom number generation function may be used as an individual key value.

In the present embodiment, for example, the individual key storage section 54 stores the individual key generated by the individual key generation section 52. The individual key is stored in the secure module 24, and the main processor 20 cannot access the individual key stored in the secure module 24.

In the present embodiment, for example, the ICV data generation section 56 calculates an ICV based on the verified 32nB digest value data 70 by using the individual key. Then, the ICV data generation section 56 generates ICV data 76 indicating the calculated ICV. Here, for example, the ICV data 76 indicating a CMAC (Cipher-based Message Authentication Code) value is generated by performing a message authentication code algorithm using a block cipher such as an AES (Advanced Encryption Standard)-CMAC algorithm. The ICV data 76 is data specific to the information processing apparatus 12. Then, the ICV data generation section 56 places the generated ICV data in the kernel memory 22a.

The ICV data 76 is smaller in data size than the 32nB digest value data 70. The ICV data 76 is, for example, (16×n) bytes in size. It should be noted that a truncated (trancated) CMAC can also be used, and in this case, the ICV data 76 is, for example, (8×n) bytes in size.

As illustrated in FIG. 6, n 16- or 8-byte portions included in the ICV data 76 are associated one by one with 64-kilobyte blocks, respectively.

In the present embodiment, for example, the ICV data storage section 58 stores the ICV data 76. Here, for example, the ICV data 76 is stored in the kernel memory 22a.

In the present embodiment, for example, the access requesting section 60 requests access to a block. Here, for example, the main processor 20 issues an access request to the secure module 24. Here, the main processor 20 may read out a part of the ICV data 76 corresponding to the block in question from the kernel memory 22a. Then, an access request to the block in question with which a value indicated by the part in question is associated may be issued to the secure module 24.

In the present embodiment, for example, the access request acceptance section 62 accepts an access request issued from the access requesting section 60. Here, for example, the secure module 24 accepts an access request to the block from the main processor 20.

In the present embodiment, for example, the ICV calculation section 64 reads out the block to which access is requested. Then, in the present embodiment, for example, the ICV calculation section 64 calculates the ICV based on the block that is read out by using the individual key stored in the individual key storage section 54. Here, as described above, the ICV indicating the CMAC value is calculated by performing a message authentication code algorithm by using the block cipher such as an AES-CMAC algorithm.

In the present embodiment, for example, the comparison section 66 compares the ICV indicated by the part of the ICV data 76 corresponding to the block to which access is requested with the ICV calculated by the ICV calculation section 64. Here, for example, the ICV associated with the access request accepted by the access requesting section 60 is compared with the ICV calculated by the ICV calculation section 64.

In the present embodiment, for example, the writing section 68 writes the block to which access is requested to the user memory 22b in a case where the comparison by the comparison section 66 succeeds (e.g., in a case where two ICVs match).

Figure 7:
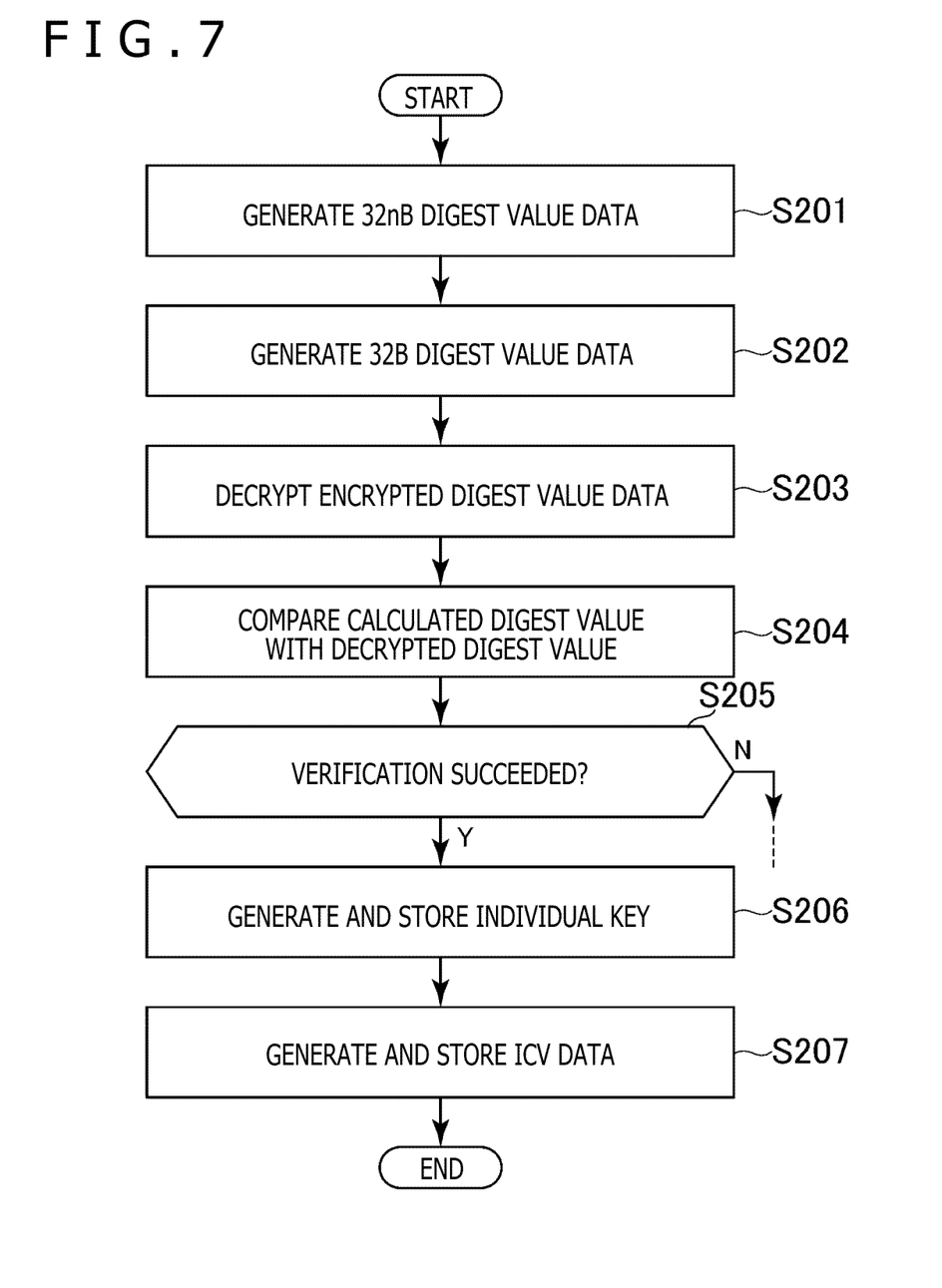
FIG. 7 is a flowchart illustrating an example of a flow of processes performed by the information processing apparatus according to the embodiment of the present invention.

A description will be given here of an example of a flow of processes performed when the information processing apparatus 12 according to the present embodiment is started with reference to the flowchart illustrated in FIG. 7.

First, the digest value data generation section 46 generates the 32nB digest value data 70 on the basis of the target data 30 (S201).

Then, the digest value data generation section 46 generates the 32B digest value data 72 on the basis of the 32nB digest value data 70 generated by the process illustrated in S201 (S202). The digest value indicated by the 32B digest value data 72 generated by the process illustrated in S202 will be hereinafter referred to as a calculated digest value.

Then, the decryption section 48 generates the decrypted digest value data 74 by decrypting the encrypted digest value data 36 (S203). The digest value indicated by the decrypted digest value data 74 generated by the process illustrated in S203 will be hereinafter referred to as a decrypted digest value.

Then, the verification section 50 verifies the 32nB digest value data 70 generated by the process illustrated in S201 by comparing the calculated digest value with the decrypted digest value (S204).

Then, the verification section 50 confirms whether or not the verification in the process illustrated in S204 succeeded (S205). Here, in a case where it is conformed that the verification failed (N in S205), a given error process is performed.

In a case where it is conformed that the verification succeeded (Y in S205), the individual key generation section 52 generates an individual key and stores the generated individual key in the individual key storage section 54 (S206).

Then, the ICV data generation section 56 generates the ICV data 76 based on the 32nB digest value data 70 generated by the process illustrated in S201 by using the individual key stored by the process illustrated in S206. Then, the ICV data generation section 56 stores the generated ICV data 76 in the ICV data storage section 58 (S207), after which the processes illustrated in the present processing example are terminated.

When the processes illustrated in the present processing example described above are performed, the target data 30, the encrypted digest value data 36, and the public key are read out from the storage 26 and placed in the kernel memory 22a as needed. Then, after the processes illustrated in S201 to S207 are terminated, the target data 30, the encrypted digest value data 36, and the public key placed in the kernel memory 22a are deleted.

Figure 8:
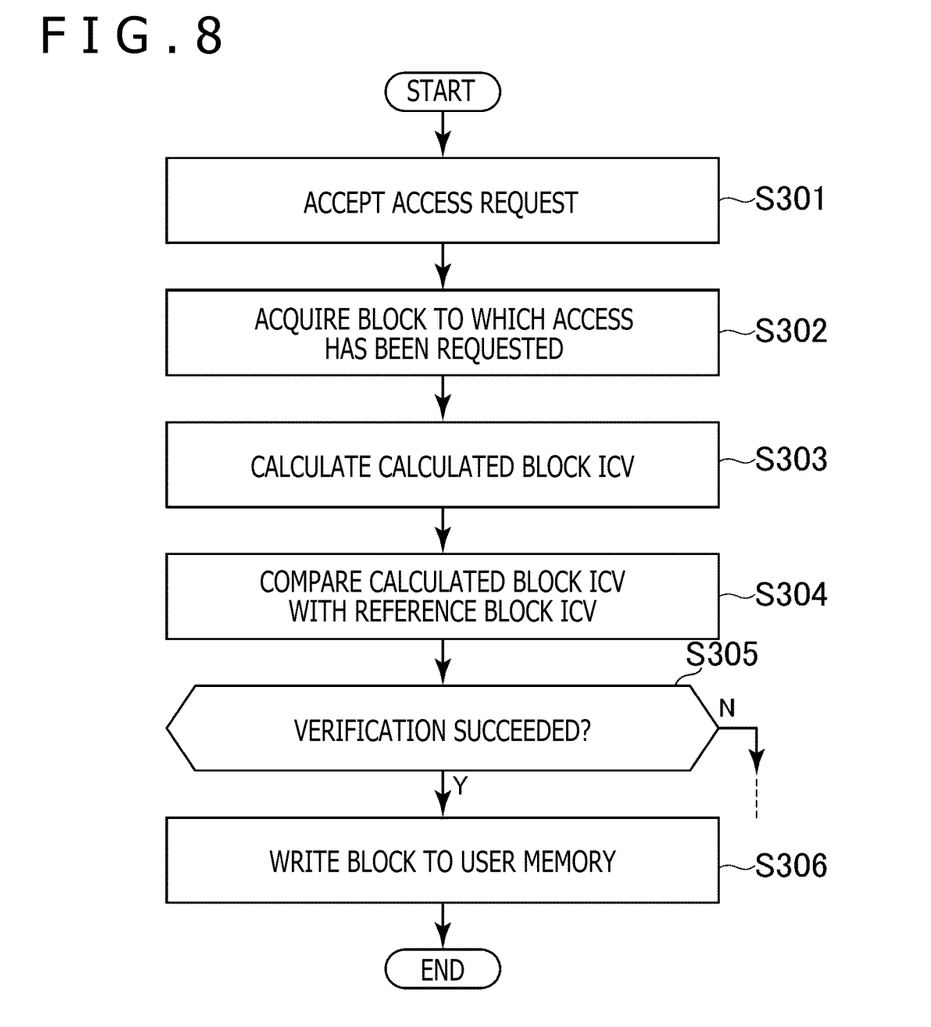
FIG. 8 is a flowchart illustrating an example of a flow of processes performed by the information processing apparatus according to the embodiment of the present invention.

A description will be given next of an example of a flow of processes performed when access is requested to a block at the time of execution of a program by the information processing apparatus 12 according to the present embodiment with reference to the flowchart illustrated in FIG. 8.

First, the access request acceptance section 62 accepts an access request to the block in question associated with an ICV and block identification information (S301). The ICV associated with the access request, i.e., the ICV indicated by a part of the ICV data 76 stored in the ICV data storage section 58, will be hereinafter referred to as a reference block ICV.

Then, the ICV calculation section 64 acquires the block to which access has been requested from the storage 26 (S302).

Then, the ICV calculation section 64 calculates the ICV based on the block acquired by the process illustrated in S302 by using the individual key stored in the individual key storage section 54 (S303). The ICV calculated in this manner will be hereinafter referred to as a calculated block ICV.

Then, the comparison section 66 compares the calculated block ICV with the reference block ICV (S304).

Then, the comparison section 66 confirms whether or not the comparison in the process illustrated in S304 succeeded (S305). Here, in a case where it is conformed that the comparison failed (N in S305), a given error process is performed.

In a case where it is conformed that the comparison succeeded (Y in S305), the writing section 68 writes the block acquired by the process illustrated in S302 to the user memory 22*b* (S306), after which the processes illustrated in the present processing example are terminated.

In the present embodiment, the ICV data 76 smaller in data size than the 32nB digest value data 70 resides in the kernel memory 22*a* for integrity check. Accordingly, it is possible to reserve more available memory 22 for program execution than if the 32nB digest value data 70 resides in the kernel memory 22*a* for integrity check.

Also, if a correspondence between the block and the ICV data 76 is determined uniquely and if one can see through the correspondence thereof, it becomes possible to tamper with the block and generate ICV data 76 that is consistent with the tampered block. In the present embodiment, an individual key having a different value is generated each time the information processing apparatus 12 is started, and the ICV data 76 based on the individual key in question is generated.

As described above, according to the present embodiment, it is possible to reduce risks of tampering with a block while at the same time keeping the size of the ICV data 76 used for integrity check to a minimum.

It should be noted that the present invention is not limited to the embodiment described above.

For example, the pieces of functionality illustrated in FIG. 5 (e.g., functionality of the secure module 24) may be implemented by hardware or software.

Also, the above specific character strings and numbers and the specific character strings and numbers in the drawings are illustrative, and the present invention is not limited to these character strings and numbers.

The invention claimed is:

1. An access control apparatus that stores target data to which access is requested, the access control apparatus comprising:
  a memory to store the target data; and
  processing circuitry configured to
  verify digest value data by comparing a generated digest value data with a decrypted digest value data,
  in a case that the digest value data is verified, generate an individual key specific to the access control apparatus,
  generate an individual key specific to the access control apparatus, wherein the individual key is newly generated each time the access control apparatus is started,
  securely store the individual key in a secure module, wherein the individual key is not accessible by the processing circuitry,
  calculate, by using the individual key, an integrity check value based on the verified digest value data,
  generate integrity check value data indicating the calculated integrity check value, the integrity check value data being specific to the access control apparatus, wherein the integrity check value data is generated based on a message authentication code algorithm using a block cipher, wherein the integrity check value data is a truncated cipher-based message authentication code (CMAC) that is smaller in data size than the verified digest value data,
  store the integrity check value data in a kernel memory,
  read out, from the kernel memory, a part of the integrity check value data corresponding to a block that is part of the target data and issue, to the secure module, an access request for the block,
  in response to the access request being approved by the secure module, read out the block to which access was requested and calculate the integrity check value based on the block that is read out by using the individual key,
  compare the integrity check value indicated by the part of the integrity check value data corresponding to the block with the calculated integrity check value, and
  write the block to the memory in a case where the comparison succeeds.

2. The access control apparatus according to claim 1, wherein
  the memory further stores encrypted digest value data that is different from the target data,
  wherein the processing circuitry is further configured to
  generate decrypted digest value data by decrypting the encrypted digest value data, and
  verify the digest value data by comparing a digest value calculated on a basis of a value of the digest value data with the digest value indicated by the decrypted digest value data.

3. The access control apparatus according to claim 2, wherein the processing circuitry is further configured to generate the digest value data on a basis of the target data, and
  verify the digest value data by comparing the digest value calculated on a basis of a value of the digest value data with the digest value indicated by the decrypted digest value data.

4. The access control apparatus according to claim 1, wherein the processing circuitry is further configured to write the block to a user memory.

5. The access control apparatus according to claim 4, wherein the processing circuitry is further configured to accept an access request to the block associated with an integrity check value indicated by the part of the integrity check value data corresponding to the block read out from the kernel memory.

6. The access control apparatus according to claim 1, wherein the integrity check value data is a truncated message authentication code.

7. The access control apparatus according to claim 1, wherein the integrity check value data is 8 bytes or 16 bytes in size for each 64 kilobyte block of the target data.

8. An access control apparatus comprising:
  a secure module, a main processor, and a memory, wherein
  the memory stores target data to which access is requested,
  the secure module generates an individual key specific to the access control apparatus, wherein the individual key is newly generated each time the access control apparatus is started,
  the secure module generates, by using the individual key, integrity check value data that is based on verified digest value data and specific to the access control apparatus, wherein the integrity check value data is a truncated cipher-based message authentication code (CMAC) that is smaller in data size than the digest value data,
  the secure module accepts, from the main processor, an access request, based on a part of the integrity check value data read out from a kernel memory, to a block that is a part of the target data, the secure module calculates an integrity check value based on the block by using the individual key, the secure module compares the integrity check value indicated by the part of the integrity check value data corresponding to the block with the integrity check value calculated by the secure module, and the secure module writes the block to the memory in a case where the comparison succeeds.

9. The access control apparatus according to claim 8, wherein the integrity check value indicated by the part of the integrity check value data corresponding to the block is associated with the access request.

10. The access control apparatus according to claim 8, wherein the secure module stores the individual key, and the main processor is not able to access the individual key stored in the secure module.

11. An access control method comprising:

generating an individual key specific to an access control apparatus that stores target data to which access is requested, wherein the individual key is newly generated each time the access control apparatus is started;

generating, by using the individual key, integrity check value data that is based on verified digest value data and specific to the access control apparatus, and wherein the integrity check value data is a truncated cipher-based message authentication code (CMAC) that is smaller in data size than the digest value data;

calculating, by using the individual key, an integrity check value based on a block that is a part of the target data to which access is requested;

reading out, from a kernel memory, a part of the integrity check value data corresponding to the block that is part of the target data and issuing, to a secure module, an access request for the block;

comparing the integrity check value indicated by the part of the integrity check value data corresponding to the block with the integrity check value calculated in the calculating; and writing the block to a memory in a case where the comparison succeeds.

12. A non-transitory computer-readable medium storing computer-readable instructions thereon which, when executed by a computer that stores target data to which access is requested, cause the computer to perform a method, the method comprising:

generating an individual key specific to the computer, wherein the individual key is newly generated each time the computer is started;

generating, by using the individual key, integrity check value data that is based on verified digest value data and specific to the computer, wherein the integrity check value data is a truncated cipher-based message authentication code (CMAC) that is smaller in data size than the digest value data;

calculating, by using the individual key, an integrity check value based on a block that is a part of the target data to which access is requested;

reading out, from a kernel memory, a part of the integrity check value data corresponding to the block that is part of the target data and issuing, to a secure module, an access request for the block;

comparing the integrity check value indicated by the part of the integrity check value data corresponding to the block with the integrity check value calculated by the calculating; and writing the block to a memory in a case where the comparison succeeds.

* * * * *